(12) United States Patent
Kinzler

(10) Patent No.: US 11,104,364 B1
(45) Date of Patent: Aug. 31, 2021

(54) INTERMODAL CARGO CONTAINER SYSTEM WITH SELECTIVELY DEPLOYABLE AUTOMATIC WHEEL BRAKE AND STABILIZER MECHANISMS

(71) Applicant: Jeffrey Lawrence Kinzler, Melville, NY (US)

(72) Inventor: Jeffrey Lawrence Kinzler, Melville, NY (US)

( * ) Notice: Subject to any disclaimer, the term of this patent is extended or adjusted under 35 U.S.C. 154(b) by 0 days.

(21) Appl. No.: 17/030,323

(22) Filed: Sep. 23, 2020

Related U.S. Application Data

(60) Provisional application No. 62/905,961, filed on Sep. 25, 2019.

(51) Int. Cl.
| | |
|---|---|
| *B62B 5/00* | (2006.01) |
| *B62B 5/04* | (2006.01) |
| *B61D 45/00* | (2006.01) |
| *B60P 7/13* | (2006.01) |

(52) U.S. Cl.
CPC .............. *B62B 5/0414* (2013.01); *B60P 7/13* (2013.01); *B61D 45/007* (2013.01)

(58) Field of Classification Search
CPC ... B62B 5/0414; B62B 5/0003; B62B 5/0423; B61D 45/007; B60P 7/13
USPC ........ 410/66, 67; 220/1.5; 188/4 R, 5, 19, 32
See application file for complete search history.

(56) References Cited

U.S. PATENT DOCUMENTS

| | | | | |
|---|---|---|---|---|
| 3,517,776 | A * | 6/1970 | San .......................... | B60T 1/14 188/4 R |
| 5,562,374 | A * | 10/1996 | Plamper ............... | B61D 45/007 410/66 |
| 2014/0205392 | A1* | 7/2014 | Wisniewski .......... | B60P 1/6418 410/66 |

* cited by examiner

*Primary Examiner* — Stephen T Gordon
(74) *Attorney, Agent, or Firm* — Alfred M. Walker

(57) ABSTRACT

A multi-modal cargo container, is capable of being transported by air, sea, rail, or truck and by manual handling, designed for intra-city delivery. The requirement of transporting maximum volume in limited urban space dictates the container's shape, dimensions, maximum weight and center of gravity. To minimize the possibility of loss of control or tipping during manual transport over uneven or sloped ground, Stabilizer and braking systems are provided that will stop the container and prevent tipping along its longitudinal axis either by manual or automatic operation. It is intended that the container will be operated by one or two handlers at either narrow end, and that dual redundant manual controls are provided for manual operation of the brake, manual deployment of the Stabilizer mechanism, retraction of the Stabilizer mechanism and resetting of the automatic override feature of the braking system should it deploy automatically.

20 Claims, 10 Drawing Sheets

SHIPPING CONTAINER ELEVATIONS - STABILIZER ARM EXTENDED

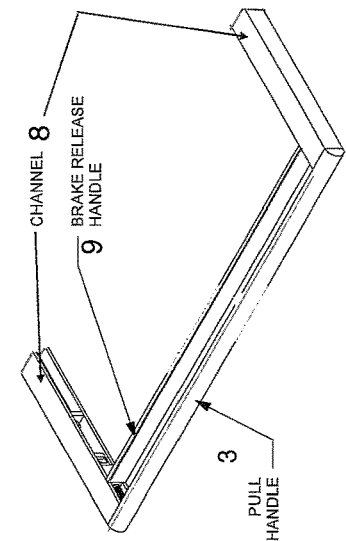
Figure 1-A  STABILIZER ARM
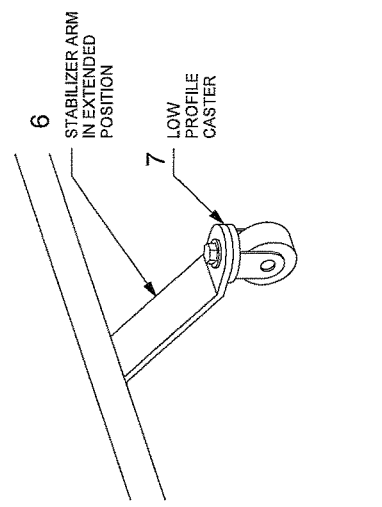
Figure 1-B  DEADMAN BRAKE RELEASE HANDLE
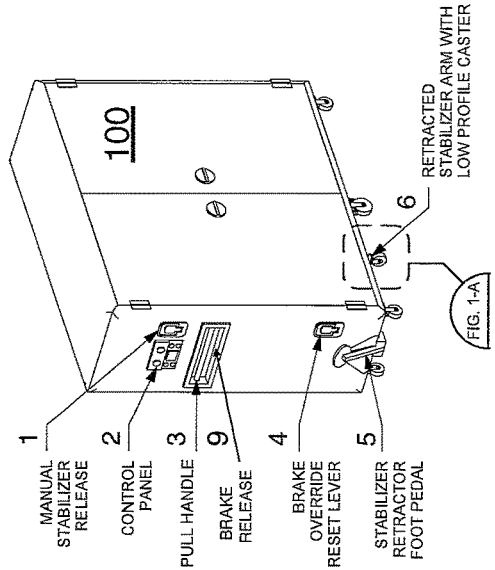
Figure 1-C  DEADMAN BRAKE CABLE LINKAGE
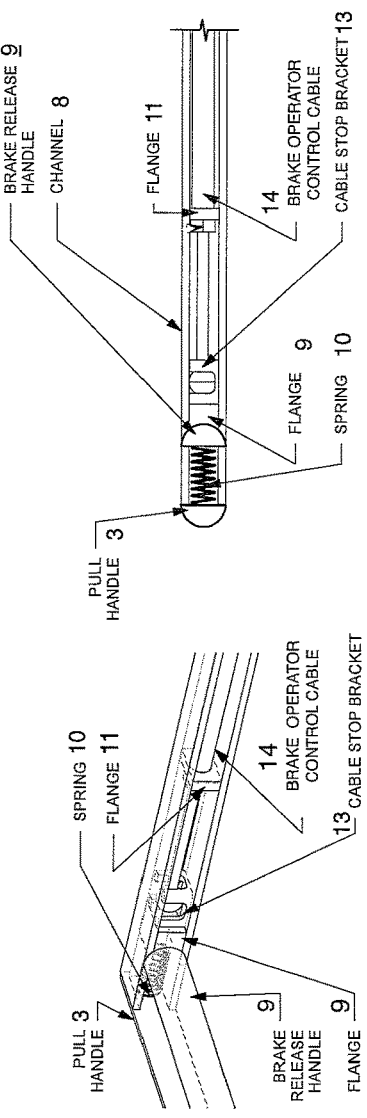
Figure 1-D  DEADMAN BRAKE RELEASE HANDLE SECTION
Figure 1-E  PLAN VIEW - DEAD-MAN BRAKE RELEASE HANDLE
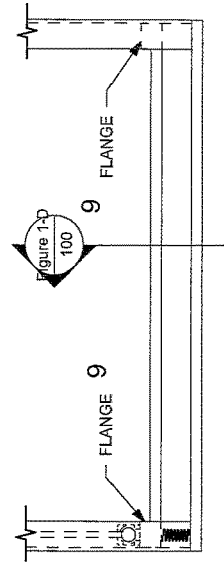
Figure 1  AXONOMETRIC VIEW

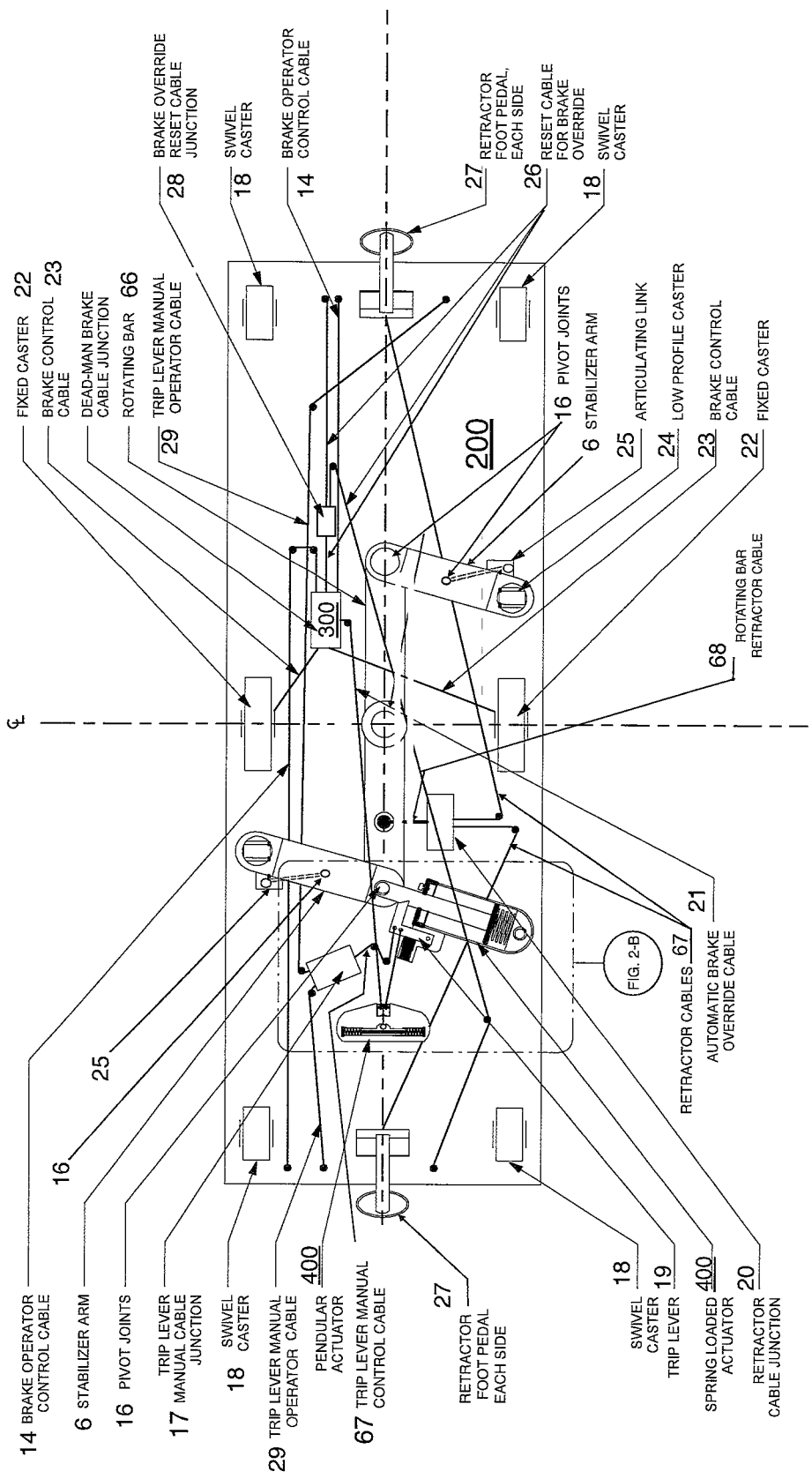
Figure 2 REFLECTED CHASSIS PLAN WITH STABILIZER ARMS RETRACTED

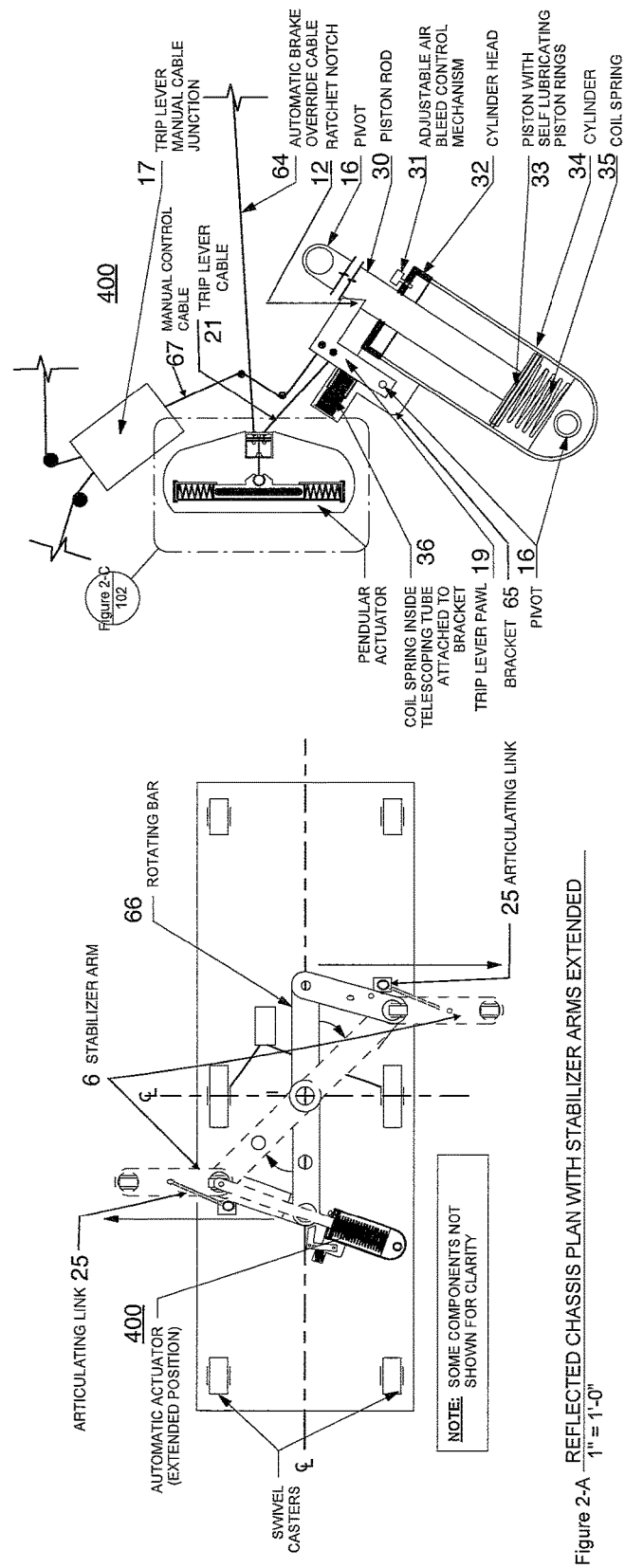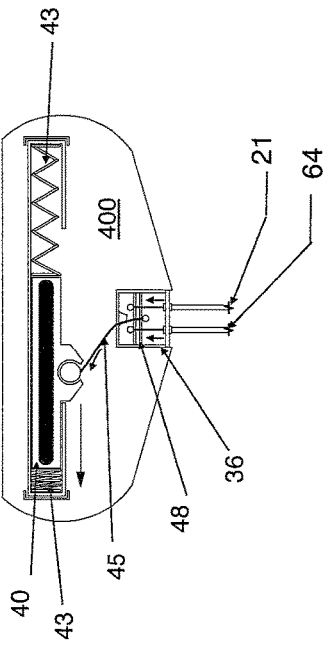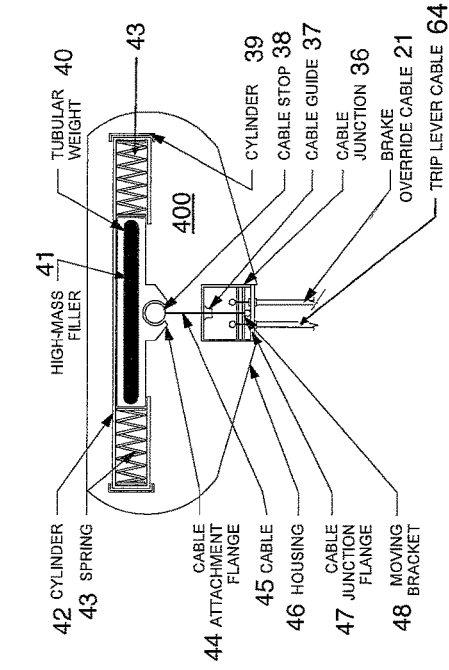

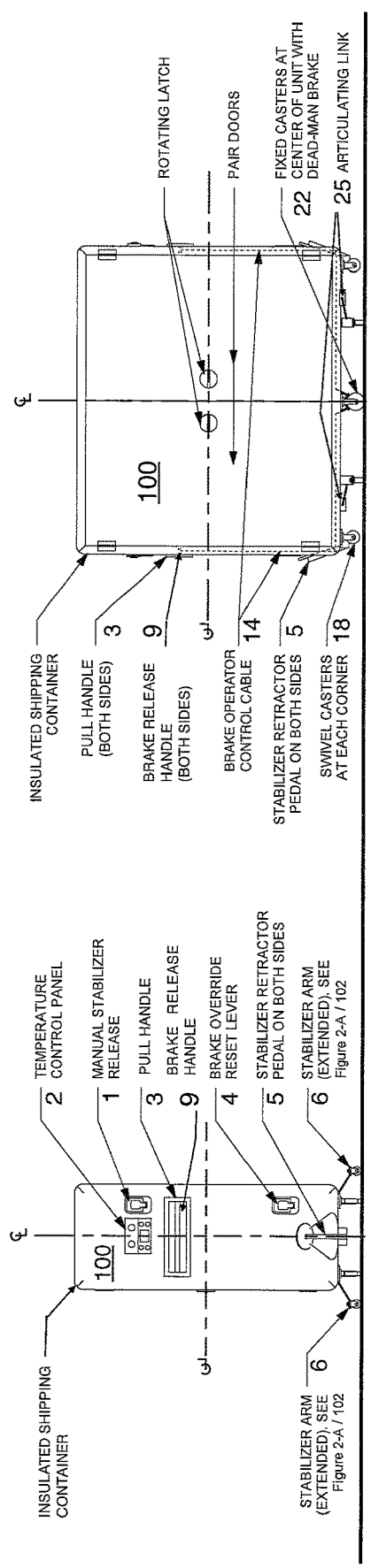
Figure 3  SHIPPING CONTAINER ELEVATIONS - STABILIZER ARM EXTENDED
Figure 4  SHIPPING CONTAINER ELEVATIONS - STABILIZER ARM EXTENDED

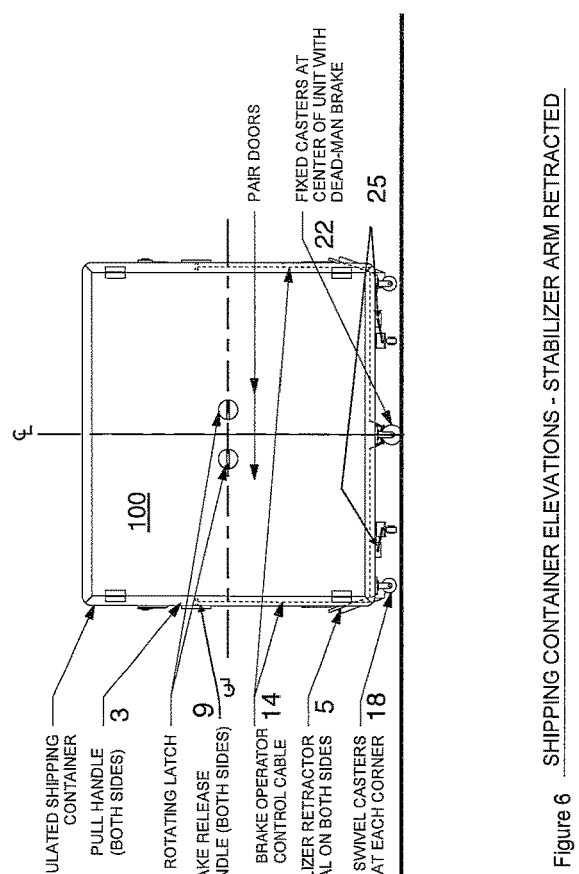
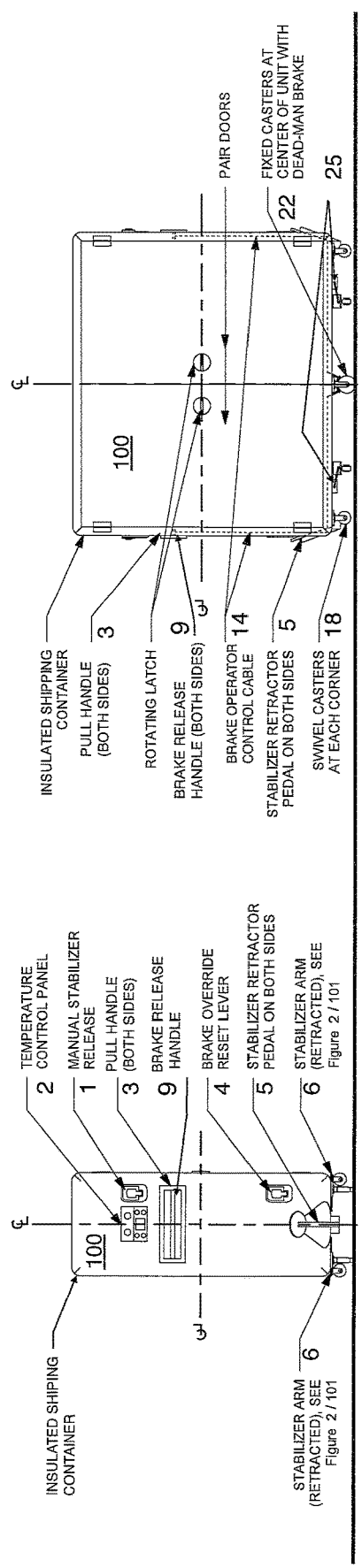
Figure 5  SHIPPING CONTAINER ELEVATIONS - STABILIZER ARM RETRACTED
Figure 6  SHIPPING CONTAINER ELEVATIONS - STABILIZER ARM RETRACTED

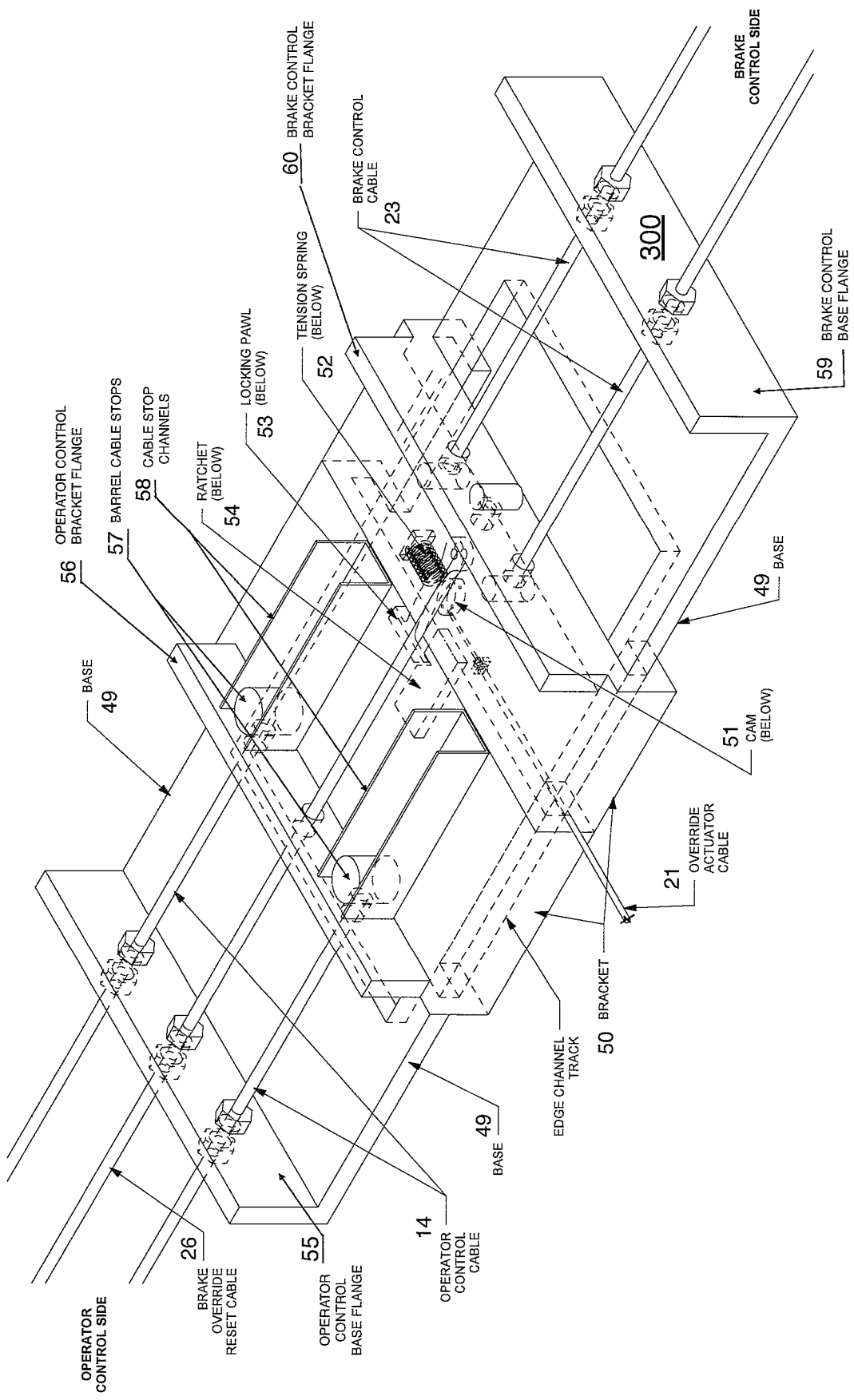
Figure 7   CABLE CONTROL JUNCTION-BRAKES ENGAGED NORMAL OPERATION

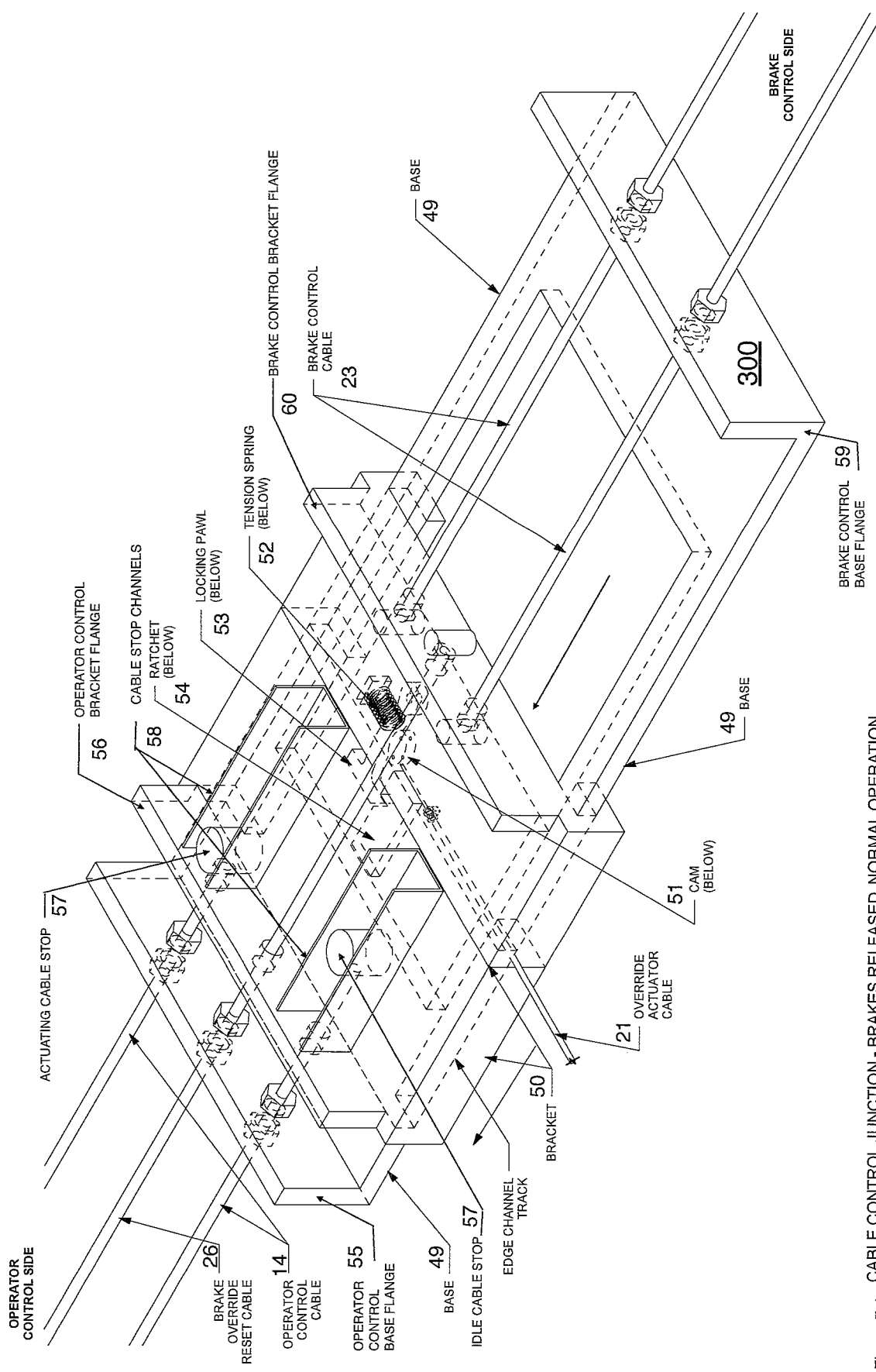
Figure 7-1 CABLE CONTROL JUNCTION - BRAKES RELEASED NORMAL OPERATION

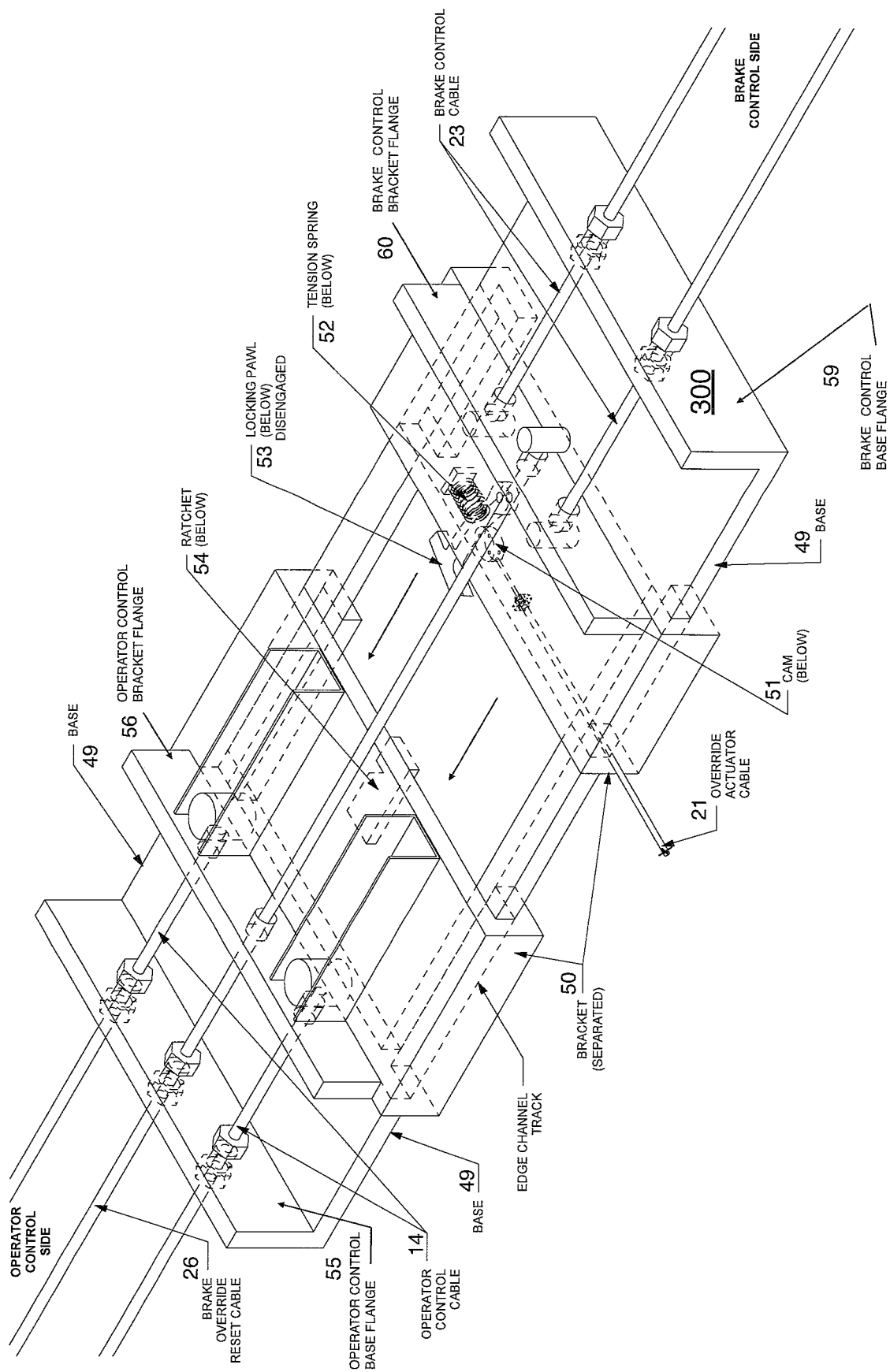
Figure 7-2   MANUAL CONTROL OVERRIDE - BRAKES ENGAGED

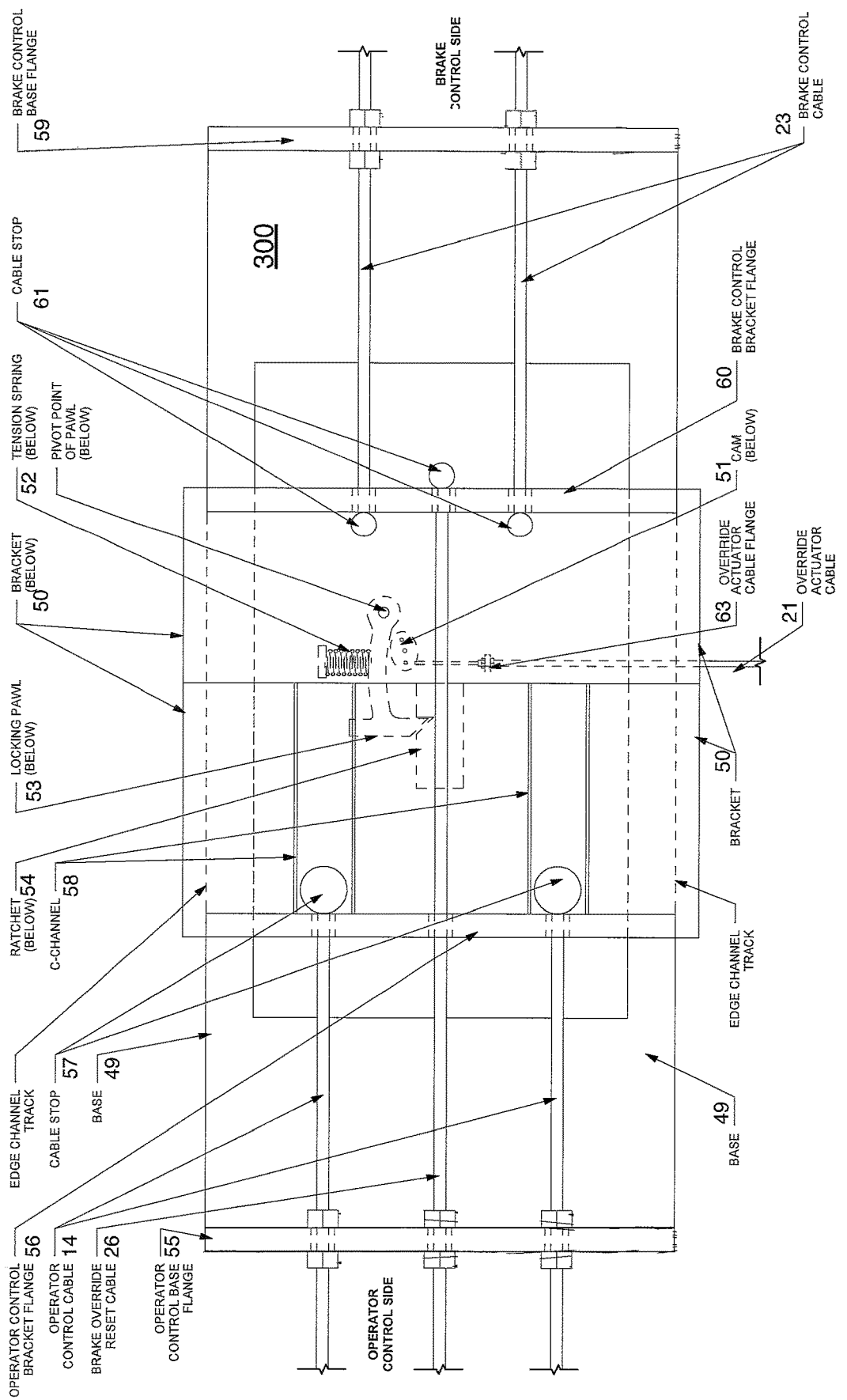
Figure 7-3  PLAN VIEW - DEADMAN BRAKE CABLE JUNCTION - BRAKES ENGAGED NORMAL OPERATION
12" = 1'-0"

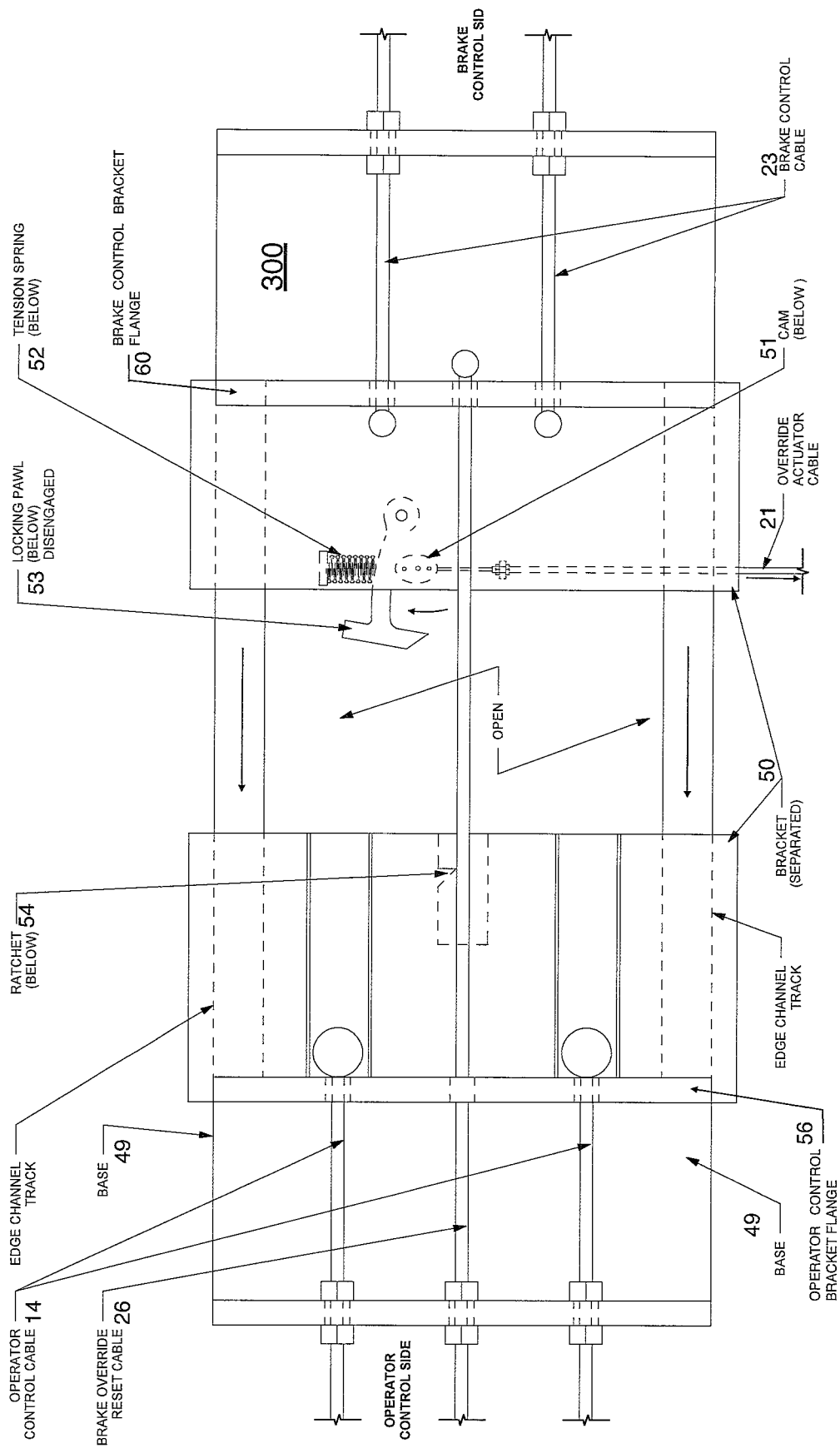
Figure 7-4  MANUAL CONTROL OVERRIDE POSITION - BRAKES ENGAGED
12" = 1'-0"

INTERMODAL CARGO CONTAINER SYSTEM WITH SELECTIVELY DEPLOYABLE AUTOMATIC WHEEL BRAKE AND STABILIZER MECHANISMS

BACKGROUND OF THE INVENTION

Field of the Invention

The present invention relates to miniaturized intermodal cargo containers that may be shipped by truck, freight rail, passenger rail, cargo or passenger ship, or by cargo or passenger plane, for storing and transporting goods individually or as part of a modular system. They may also be used for transporting emergency medical supplies, disaster relief supplies, or emergency food and life support items. Such containers may also be configured to provide emergency medical field units, emergency food delivery and preparation units and emergency life support shelter units.

Description of the Related Art

The use of a miniaturized wheel-borne cargo container for small shipments as part of a unique system for transporting items by sea, air, truck and rail to their destination presents two specific problems. The first is that the weight of the laden container is such that a positive brake action must be provided to enable safe handling while the container is being moved between modes and to prevent movement while being transported by ship, truck, rail or other means. The second problem is the prevention of tipping while being handled or stopped.

Current art consists of a selectively deploying self-braking system also called a "dead-man" brake, that may be used on mobile containers. Current art does not provide a combined mechanism for controlling the dead-man brake from multiple locations of a container. Current art also does not provide a mechanism for selectively deploying a wheel brake and Stabilizer mechanism independently or simultaneously, or for deploying of a wheel brake and Stabilizer mechanism automatically.

OBJECTS AND SUMMARY OF THE INVENTION

It is an object of the present invention to provide a cargo container having a selectively deployable automatic wheel brake and selectively deployable automatic Stabilizer mechanism.

In accordance with one embodiment of the present invention, a braking device for a cargo container is provided that is capable of being deployed simultaneously with or independently of a Stabilizer device for the cargo container by separate controls.

In another embodiment of the present invention, a Stabilizer device for a cargo container is provided that is capable of being retracted upwardly at any time during movement of the container, or deployed downward manually either when the wheel brake is applied and the container is stopped or when the wheel brake is released and the container is in motion.

In another embodiment of the present invention, a Stabilizer device for a cargo container is provided that is capable of disabling the manual dead man brake control and causing the brakes to engage simultaneously when the Stabilizer is automatically deployed.

In accordance with the general teachings of the present invention, a new and improved cargo container system is provided wherein the cargo container system includes a selectively deployable automatic wheel brake mechanism and a selectively deployable automatic Stabilizer mechanism.

That is, the wheel brake mechanism is capable of being selectively deployed by the operation of a control mechanism or automatically deployed, and the retractable Stabilizer mechanism is capable of being selectively deployed by the operation of a control mechanism or automatically deployed. The wheel brake and Stabilizer mechanism may be operated simultaneously or independently of one another. The Stabilizer mechanism is capable of being retracted upward and inward when the container is rolling on its wheels, and deployed outward and downward during stationary storage or shipment of the container (e.g. during sea, rail, truck or other means of mechanized travel) or by selective manual or automatic operation during manual transport.

At a suitable time, (e.g., the container is about to be placed on the ground or other surface for the purpose of being transported upon its wheels,) the automatic brake mechanism is released and Stabilizer mechanism may be retracted upward and inward by activating a foot pedal operated control mechanism.

It is intended that brake will operate to stop the container when the brake control mechanism is released, and it is intended that the Stabilizer mechanism may be manually deployed in such a manner as to stabilize the container when the container is stationary, or moving, or when the dead-man brake is engaged, or that it may automatically deploy at any time that the container is in danger of tipping along its longitudinal axis. When the Stabilizer mechanism deploys automatically, it also deactivates the dead man brake control causing the dead man brake to engage simultaneously.

PREFERRED EMBODIMENTS OF THE INVENTION

In accordance with a first embodiment of the present invention, a cargo container system is provided comprising: (1) a cargo container; (2) a wheel mechanism operably associated with a lower portion of the cargo container; (3) a Stabilizer mechanism operably associated with a lower portion of the cargo container; (4) a wheel brake mechanism acting on two or more wheels; (5) a dual-control deployment system to selectively operate the wheel brake; (6) a dual-control deployment system selectively operable to lower the Stabilizer mechanism away from the lower portion of the cargo container (7) a dual-control deployment system selectively operable to raise the Stabilizer mechanism towards the lower portion of the cargo container, (8) an automatic control mechanism to lower the Stabilizer mechanism away from the lower portion of the cargo container and simultaneously engage the dead man brake, (9) a brake reset mechanism, so that upon release of the wheel brake, the container may be moved freely upon its wheel mechanism with the Stabilizer mechanism either raised or lowered.

BRIEF DESCRIPTION OF THE DRAWINGS

The present invention can best be understood in connection with the accompanying drawings. It is noted that the invention is not limited to the precise embodiments snow in the following drawings, in which:

FIG. 1 is a perspective view of a cargo container formed in accordance with the present invention, having a dead man wheel brake mechanism and retractable Stabilizer mechanism.

FIG. 1-A is an enlarged view of the Stabilizer arm in a deployed position.

FIG. 1-B is a detailed perspective view of one embodiment of the combined pull handle and dead man brake release handle.

FIG. 1-C is an enlarged view of one embodiment of the means of attachment of the attachment of the dead man brake operator control cable to the dead man brake release handle shown in FIG. 1-B.

FIG. 1-D is a cross-sectional view of the combined pull handle and dead man brake release handle shown in FIG. 1-B and indicated as FIG. 1-D/100 in FIG. 1-E.

FIG. 1-E is a plan view of the combined pull handle and dead man brake release handle shown in FIG. 1-B.

FIG. 2 is a bottom plan view of the cargo container of the present invention shown in FIG. 1 and illustrating the dead man brake and Stabilizer mechanisms of the container.

FIG. 2-A is a detail of the bottom plan view of the cargo container of the present invention shown in FIG. 2 illustrating the movement of the Stabilizer mechanism of the container to its deployed position.

FIG. 2-B is an enlarged view of the Stabilizer mechanism actuator, pendular actuator mechanism and trip lever mechanism, showing both manual and automatic release mechanisms of the Stabilizer mechanism shown in FIG. 2.

FIG. 2-C is an enlarged view of the pendular actuator mechanism of the Stabilizer mechanism shown in in the circled area labelled "FIG. 2-C/102" of FIG. 2-B in resting position.

FIG. 2-D is an enlarged view of the pendular actuator mechanism of the Stabilizer mechanism of the container shown in FIG. 2-B in deployed position.

FIG. 3 is a side elevational view of the cargo container of the present invention, illustrating the retractable Stabilizer mechanism in a deployed state.

FIG. 4 is a front elevational view of the cargo container of the present invention, illustrating the retractable Stabilizer mechanism in a deployed state.

FIG. 5 is a side elevational view of the cargo container of the present invention, illustrating the retractable Stabilizer mechanism in a retracted state.

FIG. 6 is a front elevational view of the cargo container of the present invention, illustrating the retractable Stabilizer mechanism in a retracted state.

FIG. 7 is a perspective view of the Dead Man Brake Control Cable Junction in its resting position with brakes engaged.

FIG. 7-1 is a perspective view of the Dead Man Brake Control Cable Junction in its deployed operating position with brakes released.

FIG. 7-2 is a perspective view of the Dead Man Brake Control Cable Junction in its operator control override position with brakes engaged.

FIG. 7-3 is a plan view of the Dead Man Brake Control Cable Junction in its resting position with brakes engaged.

FIG. 7-4 is a plan view of the Dead Man Brake Control Cable Junction in its operator control override position with brakes engaged.

LIST OF REFERENCE NUMERALS

FIG. 1 Perspective View of Cargo Container
1 Manual Stabilizer Release
2 Control Panel
3 Pull Handle and Brake Release Assembly
4 Brake Override Reset Lever
5 Stabilizer Retractor Foot Pedal
6 Retracted Stabilizer Arm with Low Profile Caster
FIG. 1-A Deployed View of Stabilizer Arm
6 Stabilizer Arm in Extended Position
7 Low Profile Caster
FIG. 1-B Detail Perspective of Pull Handle and Brake Release Handle
3 Pull Handle
8 Channel
9 Brake Release Handle
FIG. 1-C Enlarged Detail Perspective of Brake Release Handle
3 Pull Handle
9 Brake Release Handle
9 Brake Release Handle Flange
10 Spring
11 Cable Mounting Flange
13 Cable Stop Bracket
14 Brake Operator Control Cable
FIG. 1-D Cross Section View of Brake Release Handle
3 Pull Handle
8 Channel
9 Brake Release Handle
9 Brake Release Handle Flange
10 Spring
11 Cable Mounting Flange
13 Cable Stop Bracket
FIG. 1-E Plan View of Pull Handle and Brake Release Handle
9 Brake Release Handle
9 Brake Release Handle Flange
FIG. 2 Bottom Plan View of Cargo Container Chassis 200
14 Brake Operator Control Cable
6 Stabilizer Arm
16 Pivot Joints
17 Trip Lever Manual Control Cable Junction
18 Swivel Caster
67 Trip Lever Manual Control Cable
400 Pendular Actuator
22 Fixed Caster with Dead Man Brake
23 Brake Control Cable
300 Dead-Man Brake Cable Junction
66 Rotating Bar
29 Trip Lever Manual Operator Cable
28 Brake Override Reset Cable Junction
27 Retractor Foot Pedal
26 Reset Cable for Brake Override
25 Articulating Link
23 Brake Control Cable
21 Automatic Brake Override Cable
20 Retractor Cable Junction
400 Spring Loaded Actuator
19 Trip Lever
FIG. 2-A Detail Bottom Plan View Chassis of Cargo Container
400 Actuator in Extended Position
6 Stabilizer Arms in Extended Position
25 Articulating Links in Extended Position
66 Rotating Bar in Rotated Position
FIG. 2-B Stabilizer Arm Actuator Mechanism
400 Stabilizer Arm Actuator Mechanism
400 Pendular Actuator
12 Ratchet Notch in Piston Rod
16 Pivot Joint 17 Trip Lever Manual Cable Junction
64 Automatic Brake Override Cable
30 Piston Rod
31 Adjustable Air Bleed Control Mechanism
32 Cylinder Head
33 Piston with self-lubricating piston rings
34 Cylinder
35 Coil Spring
65 Bracket
19 Trip Lever Pawl
36 Coil Spring in Telescoping Tube
FIG. 2-C Pendular Actuator in Resting Position
400
64 Trip Lever Cable
21 Brake Override Cable
36 Cable Junction
37 Cable Guide
38 Cable Stop
40 Tubular Weight
41 High Mass Filler
42 Cylinder
43 Spring
44 Cable Attachment Flange
45 Cable
46 Housing
47 Cable Junction Flange
48 Moving Bracket
FIG. 2-D Pendular Actuator in Deployed Position
400
64 Trip Lever Cable
21 Brake Override Cable
43 Spring
40 Tubular Weight
36 Cable Junction
45 Cable
48 Moving Bracket
FIG. 3 Shipping Container Side Elevations Stabilizer Arm Extended
100
1 Manual Stabilizer Release
2 Control Panel
3 Pull Handle
9 Brake Release Handle
4 Brake Override Reset Lever
5 Stabilizer Retractor Foot Pedal
6 Stabilizer Arm Shown in Extended Position
FIG. 4 Shipping Container Front Elevations Stabilizer Arm Extended
100
3 Pull Handle
9 Brake Release Handle
14 Brake Operator Control Cable
5 Stabilizer Retractor Foot Pedal
18 Swivel Casters
22 Fixed Casters with Dead Man Brake
25 Articulating Link for Stabilizer Arm
120 Pair Doors
121 Rotating Door Latches
FIG. 5 Shipping Container Side Elevations Stabilizer Arm Retracted
100
1 Manual Stabilizer Release
2 Control Panel
3 Pull Handle
9 Brake Release Handle
4 Brake Override Reset Lever
5 Stabilizer Retractor Foot Pedal
6 Stabilizer Arm Shown Retracted
FIG. 6 Shipping Container Front Elevation Stabilizer Arm Retracted
100
3 Pull Handle
9 Brake Release Handle
14 Brake Operator Control Cable
5 Stabilizer Retractor Foot Pedal
18 Swivel Casters
22 Fixed Casters with Dead Man Brake
25 Articulating Link for Stabilizer Arm
120 Pair Doors
121 Rotating Door Latches
FIG. 7
Dead Man Brake Cable Control Junction Brakes Engaged Normal Operation
300
14 Operator Control Cable
21 Brake Override Actuator Cable
23 Brake Control Cable
26 Brake Override Reset Cable
49 Base
50 Moving Bracket
51 Cam for Automatic Override
52 Tension Spring for Automatic Override Locking Pawl
53 Locking Pawl for Automatic Override
54 Ratchet for Automatic Override
55 Operator Control Base Flange
56 Operator Control Bracket Flange
57 Operator Control Cable Stops
58 Cable Stop C-Channels
59 Brake Control Base Flange
60 Brake Control Bracket Flange
FIG. 7-1 Dead Man Brake Cable Control Junction Brakes Released Normal Operation
300
14 Operator Control Cable
21 Brake Override Actuator Cable
23 Brake Control Cable
26 Brake Override Reset Cable
49 Base
50 Moving Bracket
51 Cam for Automatic Override
52 Tension Spring for Automatic Override Locking Pawl
53 Locking Pawl for Automatic Override
54 Ratchet for Automatic Override
55 Operator Control Base Flange
56 Operator Control Bracket Flange
59 Brake Control Base Flange
60 Brake Control Bracket Flange
FIG. 7-2 Manual Control Override-Brakes Engaged, Plan View
300
14 Operator Control Cable
21 Brake Override Actuator Cable
23 Brake Control Cable
26 Brake Override Reset Cable
49 Base
50 Moving Bracket
51 Cam for Automatic Override
52 Tension Spring for Automatic Override Locking Pawl
53 Locking Pawl for Automatic Override
54 Ratchet for Automatic Override
55 Operator Control Base Flange
56 Operator Control Bracket Flange
59 Brake Control Base Flange
60 Brake Control Bracket Flange FIG. 7-3 Brake Cable Control Junction Brakes Engaged, Plan View
300
14 Operator Control Cable
21 Brake Override Actuator Cable
23 Brake Control Cable
26 Brake Override Reset Cable
49 Base
50 Moving Bracket
51 Cam for Automatic Override
52 Tension Spring for Automatic Override Locking Pawl
53 Locking Pawl for Automatic Override
54 Ratchet for Automatic Override
55 Operator Control Base Flange
56 Operator Control Bracket Flange
57 Operator Control Cable Stops
58 Cable Stop C-Channels
59 Brake Control Base Flange
60 Brake Control Bracket Flange
61 Brake Control Cable and Override Reset Cable Stops
FIG. 7-4 Brake Cable Control Junction Brakes Engaged, Plan View
300
14 Operator Control Cable
21 Brake Override Actuator Cable
23 Brake Control Cable
26 Brake Override Reset Cable
49 Base
50 Moving Bracket
51 Cam for Automatic Override
52 Tension Spring for Automatic Override Locking Pawl
53 Locking Pawl for Automatic Override
54 Ratchet for Automatic Override
56 Operator Control Bracket Flange
57 Operator Control Cable Stops
58 Cable Stop C-Channels
60 Brake Control Bracket Flange

DETAILED DESCRIPTION OF THE PREFERRED EMBODIMENTS

The present invention has broad applications to may technical fields for a variety of product transportation modes. For illustrative purposes only, a preferred mode for carrying out the invention is described herein.

I. The Cargo Container

The cargo container includes the following elements:

A cargo container 100, shown in FIGS. 1, 3, 4, 5, 6, constructed in accordance with one form of the present invention and as shown in FIGS. 1 through 7-4 of the drawings, includes a main housing defining an interior cavity for holding goods and packages, constructed of wood and/or metal or metal alloy and/or composite material and a wheel mechanism having a plurality of wheels, preferably six wheels, affixed to the bottom side of the housing, 18 and 22, shown in FIG. 2. More specifically, the wheel mechanism includes a first pair of wheels, separated from each other and situated in the corners of bottom side of the housing at one narrow side thereof, a second pair of rear wheels, separated from each other and situated in the corners of bottom side of the housing at the opposite narrow side thereof 18, shown in FIGS. 2, 4, 6. and a third pair of middle wheels, separated from each other and situated on the bottom side of the housing near the wide sides thereof 22, shown in FIG. 2. Preferably, each wheel of the first pair of wheels and each wheel of the second pair of wheels is a wheel that rotates 360 degrees and has a diameter which is preferably about three inches to about five inches in diameter, 18, shown in FIGS. 2, 4, 6. Preferably, each wheel of the third pair of middle, wheels 22, shown in FIG. 2, rotates on a fixed axle so that it rotates only in a forward and rearward direction with respect to the housing, and is larger in diameter than each wheel of the first and second pairs of front and rear wheels, and preferably has a diameter of between about six inches and about eight inches. Accordingly, the cargo container rests and rolls primarily on the third pair of middle wheels, and either the first pair of wheels or the second pair of wheels that are provided as ancillary wheels for stability and to enable the container to rotate about the vertical axis of the third pair of middle wheels, i.e. steer, and partially rotate on the horizontal axis of the middle wheels in order to traverse changes in elevation or gaps in its path.

II. The Stabilizer Mechanism

The Stabilizer mechanism includes the following elements:

(1) A rotating bar 66 shown in FIGS. 2 and 2-A, attached by means of a central pivot 16 to the intersection of the longitudinal and transverse centerlines of the chassis.

(2) A vertical pivot 16 shown in FIGS. 2 and 2-A at either end of the rotating bar.

(3) A pair of Stabilizer arms 6, shown in FIGS. 1, 2, 2-A, 3, 4, 5, 6, each attached by a pivot joint 16 to the pivot pin of the rotating bar on one end, shown in FIGS. 2, 2-A, and attached by a pivot joint 16 to an articulating link 25 shown in FIGS. 2, 2-A at a point between the rotating bar and its outward end.

(5) A low-profile caster 7 shown in FIGS. 1, 1-A, 2 and 2-A, 3, 4, 5, 6 attached to the outward end of each Stabilizer arm.

(6) Articulating links 25 shown in FIGS. 2, 2-A mounted to the chassis by means of a fixed bracket with a pivot joint 16 shown in FIGS. 2 and 2-A and attached to each Stabilizer arm by a sliding pivot joint to a point in the Stabilizer arm 6 shown in FIGS. 2 and 2-A located between the attachment to the rotating bar 66 shown in FIGS. 2, 2-A and the outward end of the Stabilizer arm, 6 shown in FIGS. 2 and 2-A.

(7)) A mechanically powered actuator 400 shown in FIGS. 2, 2-A and 2-B, including a cylinder with one open and one closed end 34, shown in FIG. 2-B and a cylinder head attached to the open end 32, shown in FIG. 2-B with a concentric opening for the piston rod 30 shown in FIG. 2-B, a piston 33 shown in FIG. 2-B, with one or more self-lubricating piston rings, a coil spring, 35 shown in FIG. 2-B, located between the piston and the closed end of the cylinder 34 shown in FIG. 2-B, a piston rod, 30 shown in FIG. 2-B connected to the piston, 33 shown in FIG. 2-B on one end and to a pivoting joint 16 shown in FIG. 2-B on the rotating bar 66 shown in FIG. 2-A on the opposite end, an adjustable air bleed control mechanism in the cylinder head including an air valve to regulate the piston speed by restricting movement of air displaced by the piston, 31 shown in FIG. 2-B, and a pivot joint attached to the fixed end of the cylinder and attached to the container chassis, 16 shown in FIGS. 2, 2-A, 2-B.

(8) A spring-loaded trip lever release mechanism for the actuator 19 shown in FIGS. 2, 2-A, 2-B including a coil spring inside a telescoping tube 36 shown in FIG. 2-B attached to the trip lever mounting bracket 65 shown in FIGS. 2, 2-A, 2-B, to hold the trip lever pawl in the ratchet notch of the piston rod 12 shown in in FIG. 2-B to restrain the piston of the stabilizer arm actuator against the tension of the coil spring 35 shown in FIG. 2-B when actuator is not being operated automatically or manually.

(9) A trip lever manual control cable junction 17 shown in FIGS. 2, 2-B.

(10) A trip lever manual control cable 67 shown in FIG. 2, connecting the manual control cable junction 17 to the trip lever 19 shown in FIGS. 2, 2-B.

(11) Manual control levers 1 located on either narrow side of the container shown in FIGS. 1, 3, 5.

(12) Manual control actuating cables 29 shown in FIG. 2, connected to levers 1 on either narrow side of the container on shown in FIGS. 1, 3, 5, and to the manual control cable junction 17 at the other end, shown in FIGS. 2, 2-B

(13) An automatic, pendular actuated linkage 400 shown in FIG. 2, 2-B, 2-C, 2-D, connected to by a trip lever cable 64 to the trip lever release mechanism shown in FIGS. 2, 2-B.

(14) A low-profile caster 7 shown in FIGS. 1, 1-A, 3, 4, 5, 6, mounted at the end of each Stabilizer bar.

*II. Trip Lever Release Mechanism

A trip lever release mechanism for the actuator including the following elements:

1. A bracket attached to or integrally made as part of the cylinder head or cylinder body, parallel to the longitudinal axis of the cylinder, 65 shown in FIG. 2-B, containing a pivot joint located near the portion of the bracket farthest from the cylinder head, 16 shown in FIG. 2-B.
2. A trip-lever pawl attached to the bracket at the pivot joint, 19 shown in FIG. 2-B.
3. Provisions on the trip lever pawl for attaching actuating cables from the pendular actuator 400 shown in FIGS. 2, 2-B and trip lever manual control cable junction 17 shown in FIGS. 2, 2-B.
4. A ratchet-notch located on the piston rod 30 shown in FIG. 2-B. in alignment with the trip-lever pawl 19 shown in FIG. 2-B.
5. A telescoping enclosure containing a tension spring 36 shown in FIG. 2-B, attached to the bracket 65 shown in FIG. 2-B.
6. A tension spring 36 shown in FIG. 2-B within the telescoping structure situated to apply pressure upon the trip lever pawl 19 shown in FIG. 2-B to keep it engaged with the ratchet-notch of the piston rod 12 shown in FIG. 2-B, in resting position, i.e. when not being actuated by the automatic pendular or manual controls.

Operation of the Trip Lever Release Mechanism

In its resting position, the trip lever release mechanism is held against the piston rod by the tension spring, causing the trip lever pawl 19 shown in FIG. 2-B to engage with the ratchet notch 12 shown in FIG. 2-B in the piston rod, 30 shown in FIG. 2-B, causing the actuator to remain in the retracted position shown in FIGS. 2, 2-B.

When the automatic pendular actuator 400 shown in FIG. 2-B or the manual control cable junction 17 shown in FIG. 2, 2-B activate their respective attached cables, 21, 67 shown in FIG. 2-B, the trip lever pawl is pulled back on its pivot to disengage from the piston rod, as shown in FIG. 2-A, releasing the Stabilizer actuator to its deployed position.

Retracted Position of the Stabilizer Mechanism

In the retracted position, the rotating bar 66 shown in FIG. 2, is rotated in alignment with the longitudinal centerline of the container, and the attached ends of the stabilizer aims 6 shown in FIG. 2, are positioned toward the longitudinal center line of the container chassis 200 shown in FIG. 2. Simultaneously, the articulating link 25 shown in FIGS. 2, 2-A, 4, 6, rotates in an upward and inward arc from its chassis-mounted pivot, causing the stabilizer arm 6 shown in FIG. 2, to move upward toward the underside of the chassis. The attached Stabilizer arm 6 is retracted and lifted upward and moves inward to a position above the fixed casters 22 shown in FIGS. 2, 5, 6.

Deployed Position of the Stabilizer Mechanism

In a deployed position, the rotating bar 66 shown in FIGS. 2, 2-A is rotated in a direction perpendicular to the longitudinal centerline of the container shown by dotted lines in FIG. 2-A, causing the attached ends of the Stabilizer arms 6 shown in FIGS. 2, 2-A to move in an outward direction shown by dotted lines in FIG. 2A. Simultaneously, the articulating link 25 shown in FIGS. 4, 6 rotates in a downward arc from its chassis-mounted pivot, causing the Stabilizer arm to move downward toward the ground as it moves outward, until the caster touches the ground shown in FIGS. 1-A, 2-A, 3, 4.

III. Automatic Operation System of the Stabilizer Mechanism

The automatic operation system of the Stabilizer mechanism includes the following elements:

(1) A mechanically powered actuator 400 shown in FIGS. 2, 2-A and 2-B, including a cylinder 34 with one open and one closed end, shown in FIG. 2-B and a cylinder head 32 attached to the open end shown in FIG. 2-B with a concentric opening for the piston rod 30 shown in FIG. 2-B, a piston 33 shown in FIG. 2-B, with one or more self-lubricating piston rings, a coil spring 35 located between the piston and the closed end of the cylinder shown in FIG. 2-B, a piston rod 30 connected to the piston 33 on one end and to a pivoting joint 16 on the rotating bar on the opposite end shown in FIG. 2-B, an adjustable air bleed control mechanism in the cylinder head 31 including an air valve to control the movement of air displaced by the piston, shown in FIG. 2-B and a pivot joint 16 attached to the fixed end of the cylinder and attached to the container chassis shown in FIGS. 2, 2-A, 2-B.

(2) A trip lever release mechanism for the actuator 19 shown in FIGS. 2, 2-A, 2-B.

(3) An automatic pendular actuator 400 shown in FIGS. 2, 2-B, 2-C, 2-D connected to the trip-lever release mechanism.

IV. Automatic Pendular Actuator

An automatic pendular actuator including the following elements:

1. A housing 46 shown in FIG. 2-C including metal or composite material, attached to or incorporated within the chassis of the container, including the following parts and/or mechanisms:
2. A cylindrical tubular weight, 40 shown in FIG. 2-C including a hollow metal or composite pipe filled with lead or other suitable substance of sufficient mass 41 shown in FIG. 2-C.
3. A cable attachment flange 44 shown in FIGS. 2-C, 2-D formed of a metal or composite material with a means for attaching the automatic pendular actuated cable, 45 shown in FIG. 2-C, 2-D, attached to a tubular cylindrical weight on its exterior circumference, along its longitudinal axis and centered between the ends of the weight.
4, A round cylinder 42 shown in FIGS. 2-B, 2-C, 2-D with a bore larger in diameter than the tubular weight, closed on either end, having a longitudinal slot beginning at the center line of the longitudinal axis and extending for a specified distance on either side of the center line so that the cable attachment flange of the tubular weight extends through the longitudinal slot, to a point outside the wall of the cylinder and is able to move freely within the slot.

5. A friction reducing surface, and/or lubricant, and/or coating and/or agent at the contact points between the tubular weight 40 and cylindrical housing 42 shown in FIG. 2-C.

6. A pair of coil springs 43 shown in FIGS. 2-B, 2-C, 2-D, placed between the ends of the tubular weight and the ends of the cylindrical housing with sufficient force to center the tubular weight in the housing when the container is level, but to allow movement of the tubular weight to either end of the cylinder when the container tips beyond a specified degree.

7. A one-cable to two-cable junction 47 shown in FIG. 2-C, with a flared cylindrical guide 37 shown in FIG. 2-C mounted to the housing, centered with the longitudinal slot of the cylinder and at the mid-point of the longitudinal axis of the housing.

8. A single cable, 45 shown in FIG. 2-C attached to the cable attachment flange of the tubular weight by a cable stop 38 shown in FIG. 2-C on one end, routed through a flared tubular guide 37 shown in FIG. 2-C and attached to the moving bracket of the cable junction 48 shown in FIG. 2-C, 2-D on the other end.

9. A Trip lever 64 cable shown in FIG. 2-C, 2-D and brake override cable 21 shown in FIG. 2-C, 2-D are attached by their housings to a stationary cable junction flange 47 shown in FIGS. 2-B, 2-C, and by cable stops to the moving bracket of the cable junction 48 shown in FIGS. 2-C, 2-D. The trip lever cable is connected at its opposite end to the trip lever pawl 19 shown in FIG. 2-B of the Stabilizer arm actuator, and the brake override cable connected at its opposite end to the automatic brake override mechanism of the dead man brake control cable junction 300 FIGS. 2, 7, 7-1, 7-2, 7-3, 7-4.

V. Automatic Deployment Operation of the Stabilizer Mechanism

The housing of the Pendular Actuator 400 shown in FIG. 2, is mounted on the bottom of the container, in an orientation parallel to the floor of the container with the longitudinal axis of the Actuator in alignment with the transverse axis of the container shown in FIG. 2. If during movement of the container, the container rotates greater than a certain permissible degree about its longitudinal axis, the tubular weight 40 shown in FIGS. 2-C, 2-D will be displaced by gravitational force and move along its housing, until it reaches the end of its travel as shown in FIG. 2-D. Simultaneously the pendular actuated cable 45 shown in FIGS. 2-C, 2-D attached to the tubular weight will be pulled in the direction of travel as shown in FIG. 2-D. The cable 45 will exert a pulling force on the moving bracket 48 in turn pulling the attached trip lever cable 64 connected to the trip lever of the Stabilizer actuator 19 shown in FIG. 2-B. The trip lever cable pulls the trip lever pawl of the Stabilizer actuator 19 shown in FIG. 2-B out of the notch in the piston rod 30, shown in FIG. 2-B releasing the tension in the coil spring 35, shown in FIG. 2-B, acting on the piston 33 shown in FIG. 2-B causing the piston rod 30 shown in FIG. 2-B to move toward the cylinder head 32 shown in FIG. 2-B exerting force on the rotating bar 66 shown in FIG. 2-A causing it to rotate about its central pivot 16 shown in FIG. 2-B and pushing the Stabilizer arms 6 shown in dotted lines shown in FIG. 2-A outward and toward the ground shown in 6 shown FIGS. 1-A, 2-A, 3, 4.

VI. Manual Deployment Mechanism of the Stabilizer Mechanism

The manual deployment mechanism of the Stabilizer mechanism includes the following elements:

(1 A mechanically powered actuator 400 shown in FIGS. 2, 2-A and 2-B, including a cylinder 34 with one open and one closed end, shown in FIG. 2-B and a cylinder head 32 attached to the open end shown in FIG. 2-B with a concentric opening for the piston rod 30 shown in FIG. 2-B, a piston 33 shown in FIG. 2-B, with one or more self-lubricating piston rings, a coil spring 35 located between the piston and the closed end of the cylinder shown in FIG. 2-B, a piston rod 30 connected to the piston 33 on one end and to a pivoting joint 16 on the rotating bar on the opposite end shown in FIG. 2-B, an adjustable air bleed control mechanism in the cylinder head 31 including an air valve to control the movement of air displaced by the piston, shown in FIG. 2-B and a pivot joint 16 attached to the fixed end of the cylinder and attached to the container chassis shown in FIGS. 2, 2-A, 2-B.

(2) A trip lever release mechanism 400 shown in FIGS. 2, 2-B for the actuator.

(3) A trip lever manual control cable junction 17 shown in FIGS. 2, 2-B.

(4) A cable 67 shown in FIGS. 2, 2-B connecting the manual control cable junction to the trip lever.

(5) A pair of manual control levers 1 shown in FIGS. 1, 3, 5. located on either narrow side of the container (6) A pair trip lever manual operator cables 29 shown in FIGS. 2, 2-B connected on one end to control levers 1 shown in FIGS. 1, 3, 5, on either narrow side of the container, and on their other end to the manual control cable junction 17 shown in FIGS. 2, 2-B.

Manual Deployment of the Stabilizer Mechanism

When manual deployment is desired, the operator operates the manual stabilizer release control lever 1 shown in FIGS. 1, 3, 5, activating the release cable 29 shown in FIG. 2, that in turn, activates the trip lever pawl 19 of the actuator release mechanism 400 shown in FIGS. 2, 2-B releasing the actuator, 400 exerting force on the rotating bar 66 shown in FIGS. 2, 2-A, and causing deployment of the Stabilizer arms 6 shown in dotted lines in FIG. 2-A and shown in FIGS. 1-A, 3, 4.

VII. Dual Retracting Mechanism of the Stabilizer Mechanism

The retracting mechanism of the Stabilizer mechanism includes the following elements:

(1) A mechanically powered actuator 400 shown in FIGS. 2, 2-A, 2-B.

(2) A rotating bar retracting cable 68 shown in FIG. 2, attached at one end to the rotating bar 66 shown in FIG. 2, and attached at its opposite end to a two-into-one retractor cable junction 20 shown in FIG. 2 mounted to the container chassis 200 shown in FIG. 2, and a pair of retractor operating cables 67 shown in FIG. 2 attached at one end to the cable junction 20 shown in FIG. 2 and at their opposite ends to a foot-pedal operated retractor mechanism 5 shown in FIGS. 1, 2, 3, 4, 5, 6.

(3) A foot-pedal operated cable retractor mechanism 5 shown in FIGS. 1, 2, 3, 4, 5, 6 located near the container bottom on either narrow side of the container, incorporating a ratchet-type mechanism that automatically operates to allow the cable to reel out without resistance upon deployment of the automatic stabilizer mechanism 400 and engages to retract the cable 67 shown in FIG. 2 when the foot-pedal is operated to retract the Stabilizer mechanism.

Operation of the Retracting Mechanism of the Stabilizer Mechanism

When retraction of the Stabilizer mechanism is desired, the operator depresses the foot pedal 5 shown in FIGS. 1, 2, 3, 4, 5, 6 acting on the retractor cables 67, shown in FIG. 2 and retractor cable junction 20 shown in FIG. 2 which in turn retracts the rotating bar retractor cable 68 shown in FIG. 2, that in turn, pulls the rotating bar and actuator back toward the cylinder 34 shown in FIG. 2, and resets the actuator trip lever release mechanism 400 shown in FIGS. 2, 2-A and 2-B.

VIII. Dual-Control Dead Man Brake Mechanism

The dual-control dead man brake mechanism of the cargo container includes the following elements:

(1) A pair of fixed middle wheels 22 shown in FIGS. 1, 2, 3, 4, 5, 6 each with an internal or external dead man brake.

(2) A dual-control control dead man brake cable junction 300 shown in FIGS. 2, 7, 7-1, 7-2, 7-3, 7-4.

(3) An automatic brake override cable 21 shown in FIGS. 2, 2-B, 2-C, activated by the automatic pendular-actuator linkage 400 shown in FIGS. 2, 2-B, 2-C, 2-D.

(4) A pair of brake control cables 23 shown in FIGS. 2, 7, 7-1, 7-2, 7-3, 7-4, attached at one end to each dead man brake, and attached at the opposite end to the cable control junction 300 shown in FIGS. 2, 7, 7-1, 7-2, 7-3, 7-4.

(5) A pair of brake operator control cables 14 shown in FIGS. 2, 4, 6, 7, 7-1, 7-2, 7-3, 7-4 attached at one end to brake release handles 9 shown in FIGS. 1, 1-B, 1-C-1-E, 3, 4, 5, 6 located on each narrow side of the container and attached on the opposite end to the dead man brake control junction 300 shown in FIGS. 2, 7, 7-1, 7-2, 7-3, 7-4.

(6) A combination pull handle and brake release handle mechanism 3, 9 shown in FIGS. 1, 1-B, 1-C, 1-D, 1-E, 3, 4, 5, 6 at either narrow end of the container.

IX. Combination Pull Handle and Dead Man Brake Control Mechanism

A combination pull handle and dead man brake control mechanism 3, 9 shown in FIGS. 1, 1-B, 1-C, 1-D, 1-E, 3, 4, 5, 6 including the following elements:

(1) Two equal length C channels 8 shown in FIGS. 1, 1-B, mounted in a parallel position to one another in a recessed area on either narrow side of the container.

(2) One pull handle 3 shown in FIGS. 1, 1-B, 1-C, 1-D, 1-E, 3, 4, 5, 6 including a half-round shaped fixed bar approximately 1 inch in diameter affixed at each end to the outer end of the parallel C channels 8 shown in FIGS. 1, 1-B, with the curved face of the bar facing outward, i.e., away from the body of the container shown in FIGS. 1, 1-C, 1-D.

(3) One brake release handle 9 shown in FIGS. 1, 1-B, 1-C, 1-D, 1-E, 3, 4, 5, 6 including a half-round shaped sliding bar approximately 1 inch in diameter affixed at each end to a rectangular flange 9 shown in FIG. 1-E with each flange fitted to slide along the length of the inside of each of the parallel C channels 8, shown in FIG. 1-E so that the sliding bar remains perpendicular to the C channels 8 shown in FIG. 1-B, with the curved face of the bar facing inward, i.e. toward the body of the container, and the flat face of the brake release handle facing the flat face of the pull handle 3 shown in FIGS. 1-B, 1-C, 1-D, 1-E.

(4) A cable stop bracket 13 shown in FIGS. 1-C, 1-D affixed to one of the rectangular flanges 9 affixed to brake release handle 9 shown in FIGS. 1-C, 1-D, 1-E.

(5) A fixed flange 11 shown in FIGS. 1-C, 1-D attached to the C channel facing the cable stop bracket connector, for mounting the brake operator control cable 14 shown in FIGS. 1-C, 1-D.

(6) A gap between the pull handle and the brake control handle shown in FIGS. 1-B, 1-D, 1-E to allow sufficient movement of the brake control cable to operate the dead man brake mechanism.

(7) A spring 10 shown in FIG. 1-D positioned in each C channel to keep the fixed and sliding bars separated when not being actuated to release the dead man brake.

(8) A low-friction surface on the contact surfaces of the rectangular flanges 9 shown in FIG. 1-E and inside surfaces of the C-channel 8 shown in FIGS. 1-B, 1-C, 1-D, 1-E to allow free and smooth movement of the brake release handle flanges within the C channels.

Manual Operation of the Combined Pull Handle and Dead Man Brake Control.

When the container is at rest, the dead man brake on each fixed caster 22 shown in FIG. 2 is engaged locking the wheels and preventing movement of the container either fore and aft or in rotation along its vertical axis. To release the dead man brake and move the container, an operator places a hand around both bars of the pull handle 3 and brake release 9 shown in FIGS. 1-B, 1-C, 1-D, 1-E and squeezes them together. This action pulls the brake operator control cable 14 attached to the brake release handle 9 shown in FIGS. 1-C, 1-D, 1-E, causing the cable to act on the dead man brake cable junction 300 shown in FIGS. 2, 7, 7-1, 7-2, 7-3, 7-4 pulling the movable bracket 50 shown in FIGS. 7, 7-1, 7-2, 7-3, 7-4 toward the operator control base flange 55 shown in FIGS. 7, 7-1, 7-2, 7-3 in turn acting on the brake control cables 23 shown in FIGS. 2, 7, 7-1, 7-2, 7-3, 7-4 releasing the dead man brake on each center wheel.

The unique feature of the Dual Control Dead Man Brake Mechanism is that it can be operated by either of two operating levers located on opposite ends of the container, and that either lever can operate the dead man brake mechanism independently of the other or simultaneously.

X. Brake Control Cable Junction with Automatic Cable Release and Manual Reset Mechanism A brake control cable junction 300 shown in FIGS. 2, 7, 7-1, 7-2, 7-3, 7-4 with automatic cable release and manual reset mechanism including the following elements:

(1) rectangular metal base ("base") 49 shown in FIGS. 7, 7-1, 7-2, 7-3, 7-4 with a transverse operator control base flange 55 shown in FIGS. 7, 7-1, 7-2, 7-3, projecting upward on one end with penetrations for mounting the operator control cable housing ends and the brake override reset cable housing end, and a transverse brake control base flange 59 projecting upward on the opposite end of the base with penetrations for mounting the brake control cable housing ends shown in FIGS. 7, 7-1, 7-2, 7-3.

(2) A rectangular movable bracket 50 ("bracket") shown in FIGS. 7, 7-1, 7-2, 7-3, 7-4 of shorter longitudinal dimension than the base, having transverse flanges projecting upward at the either end of the bracket and having longitudinal C-channels attached on both longitudinal sides of the base projecting downward, positioned with channel openings facing one other, separated by a distance slightly greater than the width of the base and positioned to engage with the longitudinal edges of the base 49 shown in FIGS. 7, 7-1, 7-2, 7-3, 7-4 and act as guides for the longitudinal movement of the bracket in relation to the longitudinal axis of the base shown in FIGS. 7, 7-1, 7-2, 7-3, 7-4.

(3) One transverse flange of the bracket, ("operator control bracket flange") 56 shown in FIGS. 7, 7-1, 7-2, 7-3, 7-4 is intended to be positioned adjacent to the operator control base flange 55 shown in FIGS. 7, 7-1, 7-2, 7-3, 7-4 having penetrations and provisions for mounting the operator control cables directly to the flange by means of barrel cable stops, and having a penetration for the brake override reset cable 26 shown in FIGS. 7, 7-1, 7-2, 7-3, 7-4.

(4) Two cable stop C-channels 58 shown in FIGS. 7, 7-1, 7-2, 7-3, 7-4 mounted adjacent and tangent to the inside face of the operator control flange of the movable bracket with the open end of the channel facing upward, centered with the penetrations for the operator control cables, extending a certain distance from the inside face of the operator control bracket flange toward the brake control bracket flange to allow sufficient clearance for attachment of the brake control cables to the opposite flange, and of equal height to the barrel cable stops 57 shown in FIGS. 7, 7-1, 7-2, 7-3, 7-4 and of sufficient width to allow the barrel cable stops 57 to move freely within the channel shown in FIGS. 7, 7-1, 7-3. The intention of this method of attaching the operator control cables 14 to the operator control bracket flange 56 is to allow the operator control cables to act independently of one another to manually control the dead man brake operation by allowing the operator control cables to engage the cable junction mechanism individually or simultaneously. Individual brake control operation is illustrated in FIG. 7-1 where one operator control cable stop 57 is shown having moved the bracket 50 toward the operator control base flange 55, thereby pulling the brake control cables 23 toward the operator control base flange, releasing the dead man brake mechanism.

(5) One transverse flange of the bracket, ("brake control bracket flange") 60 is positioned adjacent to the brake control flange of the base 59, and has penetrations for mounting the brake control cable ends directly to the flange and having provisions for attaching the brake override reset cable 26 directly to the flange on one end, and via a two-into-one cable junction 28 shown in FIG. 2, to the brake override reset levers 4 shown in FIGS. 1, 3, 5 mounted on either narrow end of the container.

(6) The movable 50 bracket shown in FIGS. 7, 7-1, 7-2, 7-3, 7-4 is constructed in two parts so that it can be separated into two sections parallel to the transverse centerline, as shown in FIGS. 7-2, 7-3, 7-4, or the sections can be attached to one another to act as one unit by means of an operable latching mechanism as shown in FIGS. 7-2, 7-3, 7-4, so that the two sections may be joined by the latching mechanism 50 shown in FIG. 7, 7-1 or disengaged from one another by disengagement of the latching mechanism as shown in FIGS. 7, 7-3, 7-4. The capability of separating the two sections of the movable bracket is intended to provide an override of the manual controls for the dead man brake mechanism in the event of automatic deployment of the stabilizer mechanism. This would be accomplished by disengaging the operator control side of the bracket as shown in FIG. 7-2 from the brake control side of the sliding bracket as shown in FIG. 7-2.

* XI. Automatic Override Mechanism of the Dead Man Brake Manual Control

An automatic override mechanism for the Dead Man Brake Manual Control is provided including the following elements:

(1) A ratchet 54 shown in FIGS. 7,7-1,7-2, 7-3, 7-4, mounted to the underside of one section of the rectangular movable bracket.

(2) A locking pawl 53 shown in FIGS. 7,7-1,7-2, 7-3, 7-4 mounted to the underside of the other section of the rectangular movable bracket so that it can engage with the teeth of the ratchet.

(3) A tensioning spring 52 shown in FIGS. 7,7-1,7-2, 7-3, 7-4 mounted to the underside of one section of the rectangular movable bracket to hold the locking pawl firmly against the teeth of the ratchet, to lock the two sections of the rectangular movable bracket when the two sections are joined together.

(4) An automatic brake override actuator cable 21 shown in FIGS. 2, 2-B, 7, 7-1, 7-2, 7-3, 7-4 attached on one end to the pendular actuator 400 shown in FIGS. 2, 2-B, 2-C, 2-D and on its opposite end to the rotating cam 51 of the dead man brake cable junction.

(5) A rotating cam 51 shown in FIGS. 7,7-1,7-2, 7-3, 7-4, mounted on a pivot and positioned adjacent to the locking pawl, and having a provision for attaching the automatic brake override actuator cable 21 shown FIGS. 2, 2-B, 2-C, 2-D, 7,7-1,7-2, 7-3, 7-4 on one end so that operation of the cable will cause the cam to rotate on its pivot and raise the locking pawl, causing it to disengage from the ratchet.

Operation of the Automatic Override for the Dead Man Brake Manual Control

In the event of automatic deployment of the stabilizer mechanism, the automatic pendular actuated linkage 400 shown in FIGS. 2, 2-B, 2-C, 2-D will also act on the automatic brake override cable, 21 shown FIGS. 2, 2-B, 2-C, 2-D, 7,7-1,7-2, 7-3, 7-4 causing it to rotate the cam 51 shown in FIGS. 7,7-1,7-2, 7-3, 7-4, of the automatic override mechanism of the dead man brake control cable junction 300 as shown in FIG. 7-4. When the automatic brake override mechanism is activated, as shown in FIG. 7-4, the locking pawl 53 is disengaged from the ratchet 54 as shown in FIG. 7-4, allowing the two sections of the rectangular movable bracket 50 to separate as shown in FIGS. 7-2, 7-4 disengaging the brake control cables 23 from the operator control cables 14 as shown in FIGS. 7-2, 7-4, thereby allowing the brake to automatically engage.

XII. Automatic Override Reset Mechanism

A reset mechanism for the Automatic Override of the Dead Man Brake Manual Control is provided including the following elements:

(1) A brake override reset lever 4 on each narrow end of the container as shown in FIGS. 1, 3, 5.

(2) Two brake override reset cables 26 shown in FIG. 2. that are attached to the brake override reset levers on each narrow side of the container and to the two-into-one brake override reset cable junction 28 shown in FIG. 2.

(3) A two-into-one cable junction 28 shown in FIG. 2 feeding a single brake override reset cable 26 into the brake cable junction 300, which cable is attached to the brake control cable bracket flange 60 of the moving bracket 50 as shown in FIGS. 2, 7, 7-1, 7-2, 7-3, 7-4.

Operation of the Automatic Brake Override Reset Mechanism

To reset the dead man brake operator control cables to manual operation, the operator activates the brake override reset lever 4 shown in FIGS. 1, 3, 5, which acts on the brake override reset cable 26 shown in FIGS. 2, 7, 7-1, 7-3 causing the cable 26 to move the two sections of the bracket 50 shown in FIGS. 7, 7-1, 7-3 together as engaging the locking pawl 53 and ratchet 54 shown in FIGS. 7, 7-1, 7-3, so that the two halves of the moving bracket act as one unit, and the brake control cables 23 shown in FIGS. 7, 7-1, 7-3 can again be controlled by the operator control cables 14 shown in FIGS. 7, 7-1, 7-3.

SCOPE OF THE PRESENT INVENTION

In the foregoing description, certain terms and visual depictions are used to illustrate the preferred embodiment. However, no unnecessary limitations are to be construed by the terms used or illustration s depicted, beyond what is shown in the prior art, since the terms and illustrations are exemplary only, and are not meant to limit the scope of the present invention. It is further known that other modifications may be made to the present invention, without departing the scope of the invention.

In comparison to the mechanical components described in this embodiment, it is assumed that the functions described could also be accomplished by pneumatic, hydraulic, electrical, electro-hydraulic, electro-mechanical, electronic, or computerized means with or without computer control without departing the scope of the invention.

I claim:

1. A manually powered, stabilized cargo container comprising:
   a cargo storage compartment;
   at least one manually graspable push/pull handle;
   a chassis;
   a plurality of rolling movement members;
   a selectively releasable dead-man wheel brake mechanism;
   a dead-man brake manual control automatic override;
   at least one dead-man brake manual control automatic override reset control;
   said at least one manually graspable push/pull handle containing a manual release control for said selectively releasable dead-man wheel brake mechanism;
   a selectively deployable automatic stabilizer mechanism;
   at least one user operated selectively deployable automatic stabilizer mechanism manual control; and,
   at least one user operated selectively deployable automatic stabilizer mechanism retractor control.

2. The cargo container as in claim 1 wherein said selectively releasable dead-man wheel brake mechanism is capable of both either being deployed simultaneously with said selectively deployable automatic stabilizer mechanism, or independently of said selectively deployable automatic stabilizer mechanism.

3. The cargo container as in claim 2 wherein said selectively deployable automatic stabilizer mechanism for the cargo container is both retractable upwardly at any time during movement of the container by said at least one user operated selectively deployable automatic stabilizer mechanism retractor control or deployable downward automatically, or manually by said at least one user operated selectively deployable automatic stabilizer mechanism manual control, either when said selectively releasable dead-man wheel brake mechanism is applied and the cargo container is stopped or when said selectively releasable dead-man wheel brake mechanism is released and the container is in motion.

4. A manually powered, stabilized cargo container comprising:
   a cargo storage compartment;
   at least one manually graspable push/pull handle;
   a chassis;
   a plurality of rolling movement members;
   a selectively releasable dead-man wheel brake mechanism;
   a dead-man brake manual control automatic override;
   at least one dead-man brake manual control automatic override reset control;
   said at least one manually graspable push/pull handle containing a manual release control for said selectively releasable dead-man wheel brake mechanism;
   a selectively deployable automatic stabilizer mechanism;
   at least one selectively deployable automatic stabilizer mechanism manual control; and
   at least one user operated selectively deployable automatic stabilizer retractor control;
   wherein said selectively releasable dead-man wheel brake mechanism is capable of both either being deployed simultaneously with said selectively deployable automatic stabilizer mechanism, or independently of said selectively deployable automatic stabilizer mechanism by said at least one manual release control for said selectively releasable dead-man wheel brake mechanism;
   wherein said selectively deployable automatic stabilizer mechanism is both retractable upwardly by said at least one user operated selectively deployable automatic stabilizer retractor control, or deployable downward automatically, or manually by said at least one said selectively deployable automatic stabilizer mechanism manual control, or automatically, either when said selectively releasable dead-man wheel brake mechanism is applied and the cargo container is stopped or when said selectively releasable dead-man wheel brake mechanism is released and the container is in motion;
   wherein said selectively deployable automatic stabilizer mechanism disables said manual release control for said selectively releasable dead-man wheel brake mechanism and causes the said selectively releasable dead-man wheel brake mechanism to engage when said selectively deployable automatic stabilizer mechanism is automatically deployed;
   wherein said at least one dead-man brake manual control automatic override reset control resets automatic disabling of said manual release control for said selectively releasable dead-man wheel brake mechanism, allowing said manual release control for said selectively releasable dead-man wheel brake mechanism to resume operating after automatic deployment of said selectively deployable automatic stabilizer mechanism and automatic deployment of the selectively releasable dead-man wheel brake mechanism by said selectively deployable automatic stabilizer mechanism.

5. The cargo container as in claim 4 wherein said selectively releasable dead-man wheel brake mechanism is both either selectively deployable by the operation of said manual release control for said selectively releasable dead-man wheel brake mechanism or is automatically deployed, and said selectively deployable automatic stabilizer mechanism is selectively deployable by the operation of said at least one selectively deployable automatic stabilizer mechanism manual control or automatically deployed, wherein said selectively releasable dead-man wheel brake mechanism and said selectively deployable automatic stabilizer mechanism may be operated simultaneously or independently of one another.

6. The cargo container as in claim 5 wherein said selectively deployable automatic stabilizer mechanism is either retractable upward and inward or deployable outward and downward when the cargo container is rolling on said rolling movement members or said selectively deployable automatic stabilizer mechanism is either retractable upward and inward or deployable outward and downward during stationary storage or shipment of the cargo container, and said selectively deployable automatic stabilizer mechanism is either retractable upward and inward or deployable outward and downward by selective manual operation or deployable outward and downward by automatic operation when the cargo container is either rolling or stationary.

7. The cargo container in claim 1 wherein said rolling movement members are selected from the group consisting of wheels or casters.

8. The cargo container as in claim 1 wherein said at least one manually graspable push/pull handle, is a plurality of manually graspable push/pull handles, each said at least one manually graspable push/pull handle containing a manual release control for said selectively releasable dead-man wheel brake mechanism.

9. The cargo container as in claim 2 wherein at least one said manual release control for said selectively releasable dead-man wheel brake mechanism is a plurality of said manual release controls for said selectively releasable dead-man wheel brake mechanism.

10. The cargo container as in claim 1 wherein said at least one selectively deployable automatic stabilizer mechanism manual control is a plurality of said at least one selectively deployable automatic stabilizer mechanism manual controls for the manual deployment of said selectively deployable automatic stabilizer mechanism.

11. The cargo container as in claim 1 wherein said at least one dead-man brake manual control automatic override reset control is a plurality of at least one dead-man brake manual control automatic override reset controls for the reset of said dead-man brake manual control automatic override.

12. The cargo container as in claim 1 wherein said at least one user operated selectively deployable automatic stabilizer mechanism retractor control is a plurality of user operated selectively deployable automatic stabilizer mechanism retractor controls for the retraction of the selectively deployable automatic stabilizer mechanism.

13. The cargo container as in claim 1 wherein said selectively releasable dead-man wheel brake mechanism is both either selectively deployable by the operation of said manual release control for said selectively releasable dead-man wheel brake mechanism or is automatically deployed, and said selectively deployable automatic stabilizer mechanism is selectively deployable by the operation of said at least one user operated selectively deployable automatic stabilizer mechanism manual control or automatically deployed, wherein said selectively releasable dead-man wheel brake mechanism and said selectively deployable automatic stabilizer mechanism may operate simultaneously or independently of one another either by manual or automatic deployment.

14. The cargo container as in claim 1 wherein said selectively deployable automatic stabilizer mechanism is either retractable upward and inward or deployable outward and downward when the cargo container is rolling on said rolling movement members or said selectively deployable automatic stabilizer mechanism is either retractable upward and inward or deployable outward and downward during stationary storage or shipment of the cargo container, and said selectively deployable automatic stabilizer mechanism is either retractable upward and inward or deployable outward and downward by selective manual operation or deployable outward and downward by automatic operation when the cargo container is either rolling or stationary.

15. The cargo container in claim 4 wherein said rolling movement members are selected from the group consisting of wheels or casters.

16. A motor powered, stabilized cargo container comprising:
   a cargo storage compartment;
   a power source;
   a motor powered by said power source
   at least one manually operable control for the motor;
   at least one manually graspable push/pull handle:
   a chassis;
   a plurality of rolling movement members;
   a selectively releasable dead-man wheel brake mechanism;
   a dead-man brake manual control automatic override;
   at least one dead-man brake manual control automatic override reset control;
   said at least one manually graspable push/pull handle containing a manual release control for said selectively releasable dead-man wheel brake mechanism;
   a selectively deployable automatic stabilizer mechanism;
   at least one selectively deployable automatic stabilizer mechanism manual control; and
   at least one user operated selectively deployable automatic stabilizer retractor control;
   wherein said selectively releasable dead-man wheel brake mechanism is capable of both either being deployed simultaneously with said selectively deployable automatic stabilizer mechanism, or independently of said selectively deployable automatic stabilizer mechanism by at least one said manual release control for said selectively releasable dead-man wheel brake mechanism;
   wherein said selectively deployable automatic stabilizer mechanism for the cargo container is both retractable upwardly by said at least one user operated selectively deployable automatic stabilizer retractor control, or deployable downward manually by said at least one selectively deployable automatic stabilizer mechanism manual control, or automatically, either when said selectively releasable dead-man wheel brake mechanism is applied and the cargo container is stopped or when said selectively releasable dead-man wheel brake mechanism is released and the container is in motion;
   wherein said selectively deployable automatic stabilizer mechanism disables said manual release control for said selectively releasable dead-man wheel brake mechanism and causes the said selectively releasable dead-man wheel brake mechanism to engage when said selectively deployable automatic stabilizer mechanism is automatically deployed;
   wherein said at least one dead-man brake manual control automatic override reset control resets said automatic disabling of said manual release control for said selectively releasable dead-man wheel brake mechanism, allowing said manual release control for said selectively releasable dead-man wheel brake mechanism to resume operating after automatic deployment of said selectively deployable automatic stabilizer mechanism and automatic deployment of the selectively releasable dead-man wheel brake mechanism by said selectively deployable automatic stabilizer mechanism.

17. The cargo container as in claim 16 wherein said selectively releasable dead-man wheel brake mechanism is capable of both either being deployed simultaneously with said selectively deployable automatic stabilizer mechanism, or independently of said selectively deployable automatic stabilizer mechanism.

18. The cargo container as in claim 16 wherein said selectively deployable automatic stabilizer mechanism for the cargo container is both retractable by said at least one user operated selectively deployable automatic stabilizer mechanism retractor control, or deployable downward automatically or deployable downward manually by said at least one user operated selectively deployable automatic stabilizer mechanism manual control, either when said selectively releasable dead-man wheel brake mechanism is applied and the cargo container is stopped or when said selectively releasable dead-man wheel brake mechanism is released and the container is in motion.

19. The cargo container as in claim 18 wherein said selectively deployable automatic stabilizer mechanism for the cargo container disables said manual release control for said selectively releasable dead-man wheel brake mechanism and causes said selectively releasable dead-man wheel brake mechanism to engage simultaneously when said selectively deployable automatic stabilizer mechanism is automatically deployed.

20. The cargo container in claim 19 wherein said plurality of rolling movement members are selected from the group consisting of wheels or casters.

\* \* \* \* \*